(12) United States Patent
Hendry et al.

(10) Patent No.: US 10,972,743 B2
(45) Date of Patent: *Apr. 6, 2021

(54) METHOD FOR DECODING IMAGE AND APPARATUS USING SAME

(71) Applicant: LG ELECTRONICS INC., Seoul (KR)

(72) Inventors: Hendry Hendry, Seoul (KR); Joonyoung Park, Seoul (KR); Chulkeun Kim, Seoul (KR); Byeongmoon Jeon, Seoul (KR); Jungsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,093

(22) Filed: Apr. 21, 2020

(65) Prior Publication Data

US 2020/0252634 A1 Aug. 6, 2020

Related U.S. Application Data

(63) Continuation of application No. 16/381,051, filed on Apr. 11, 2019, now Pat. No. 10,666,958, which is a
(Continued)

(51) Int. Cl.
*H04N 19/29* (2014.01)
*H04N 19/70* (2014.01)
(Continued)

(52) U.S. Cl.
CPC ........... *H04N 19/29* (2014.11); *H04N 19/174* (2014.11); *H04N 19/184* (2014.11); *H04N 19/30* (2014.11);
(Continued)

(58) Field of Classification Search
CPC .... H04N 19/29; H04N 19/174; H04N 19/184; H04N 19/30; H04N 19/44; H04N 19/46; H04N 19/70; H04N 19/86; H04N 19/597
(Continued)

(56) References Cited

U.S. PATENT DOCUMENTS

2005/0265449 A1   12/2005  Yoon
2007/0230564 A1   10/2007  Chen et al.
(Continued)

FOREIGN PATENT DOCUMENTS

CN   100358354 C   12/2007
CN   101094405 A   12/2007
(Continued)

OTHER PUBLICATIONS

Bross, et al: "High Efficiency Video Coding (HEVC) text specification draft 9", Joint Collaborative Team on Video Coding (JCT-VC) of ITU-T SG16 WP3 and ISO/IEC JTC1/SC29/WG11, 11th Meeting, Shanghai, CN, Oct. 10-19, 2012.
(Continued)

*Primary Examiner* — Allen C Wong
(74) *Attorney, Agent, or Firm* — Dentons US LLP

(57) ABSTRACT

A method for decoding an image according to the present invention comprises the steps of: receiving and parsing a parameter set including indication information which indicates the presence of withheld information to be used in the future; receiving and parsing a slide header including the withheld information, when the indication information indicates the presence of the withheld information; and decoding the image according to semantics and a value corresponding to the withheld information. As a result, provided are a method and an apparatus for describing an additional extension information indication in a bitstream supporting a hierarchical image.

13 Claims, 8 Drawing Sheets

Related U.S. Application Data continuation of application No. 16/001,589, filed on Jun. 6, 2018, now Pat. No. 10,298,940, which is a continuation of application No. 15/445,290, filed on Feb. 28, 2017, now Pat. No. 10,015,501, which is a continuation of application No. 14/377,042, filed as application No. PCT/KR2013/011327 on Dec. 9, 2013, now Pat. No. 9,621,906.

(60) Provisional application No. 61/754,625, filed on Jan. 20, 2013, provisional application No. 61/735,552, filed on Dec. 10, 2012.

(51) Int. Cl.
*H04N 19/46* (2014.01)
*H04N 19/174* (2014.01)
*H04N 19/184* (2014.01)
*H04N 19/44* (2014.01)
*H04N 19/30* (2014.01)
*H04N 19/86* (2014.01)
*H04N 19/597* (2014.01)

(52) U.S. Cl.
CPC ............. *H04N 19/44* (2014.11); *H04N 19/46* (2014.11); *H04N 19/70* (2014.11); *H04N 19/86* (2014.11); *H04N 19/597* (2014.11)

(58) Field of Classification Search
USPC .................................................... 375/240.12
See application file for complete search history.

(56) References Cited

U.S. PATENT DOCUMENTS

| | | | |
|---|---|---|---|
| 2010/0026883 | A1 | 2/2010 | Jeon et al. |
| 2010/0118942 | A1 | 5/2010 | Pandit et al. |
| 2012/0275517 | A1 | 11/2012 | Boyce et al. |
| 2012/0307888 | A1 | 12/2012 | Guo et al. |
| 2013/0170561 | A1* | 7/2013 | Hannuksela ......... H04N 19/159 375/240.25 |

FOREIGN PATENT DOCUMENTS

| | | | |
|---|---|---|---|
| CN | 101308502 | A | 11/2008 |
| CN | 101422046 | A | 4/2009 |
| CN | 101449586 | A | 6/2009 |
| CN | 101569197 | A | 10/2009 |
| CN | 102547280 | A | 7/2012 |
| JP | 2009-081489 | A | 4/2009 |
| KR | 10-2007-0051757 | A | 5/2007 |
| KR | 10-0799592 | B1 | 1/2008 |
| KR | 10-2009-0030150 | A | 3/2009 |
| KR | 10-2010-0015737 | | 2/2010 |

OTHER PUBLICATIONS

H. Hendry: "AHG 9: Short Slice Header", JVT-K0168, XP030113050, Joint Collaborative Team on Video Coding (JCT-VC) of ITU-T SG 16 WP 3 and ISO/IEC JTC 1/SC29/WG11, 11th Meeting, Shanghai, CN, Oct. 10-19, 2012.

Wiegand, et al: "Overview of the H.264/AVC video coding standard", XP011221093, IEEE Transactions on Circuits and Systems for Video Technology, Institute of Electrical and Electronics Engineers, USA, vol. 13, No. 7, Jul. 1, 2003, pp. 560-576.

Hannuksela: "Modifications to High-Level Syntax and Semantics", XP030005368, JVT-D094, Joint Video Team of ISO/IEC MPEG & ITU-T VCEG (ISO/IEC JTC1/SC29/ WG11 and ITU-T SG16 Q.6, 4th Meeting, Klagenfurt, Austria, Jul. 22-26, 2002.

Sjoberg, R., et al., "AHG12: Slice header extension," Joint Collaborative Team on Video Coding (JCT-VC) of ITU-T SG 16 WP 3 and ISO/IEC JTC1/SC29/WG11, 9th Meeting, Geneva, Apr.-May 2012, 3 pages.

Sullivan, G., et al., "Meeting report of the ninth meeting of the Joint Collaborative Team on Video Coding (JCT-VC), Gneva, CH, Apr. 27-May 7, 2012," Joint Collaborative Team on Video Coding (JCT-VC) of ITU-T SG 16 WP 3 and ISO/IEC JTC1/SC29/WG11, 9th Meeting, Geneva, Apr.-May 2012, 238 pages.

Bross, B., et al., "High Efficiency Video Coding (HEVC) text specification draft 9," Joint Collaborative Team on Video Coding (JCT-VC) of ITU-T SG 16 WP 3 and ISO/IEC JTC1/SC29/WG11, 9th Meeting, Geneva, Oct. 2012, 280 pages.

M. Hannuksela, et al.: "Coding of Parameter Sets", JVT-0078, Joint Video Team (JVT) of ISO/IEC MPEG & ITU-T VCEG (ISO/IEC JTC1/SC29/WG11 & ITU-T Q.6), 3rd Meeting, Fairfax, Virginia, USA, May 6-10, 2002.

* cited by examiner

METHOD FOR DECODING IMAGE AND APPARATUS USING SAME

This application is a is a continuation of U.S. patent application Ser. No. 16/381,051, filed Apr. 11, 2019, which is a continuation of U.S. patent application Ser. No. 16/001,589, filed Jun. 6, 2018, now U.S. Pat. No. 10,298,940, which is a continuation of U.S. patent application Ser. No. 15/445,290, filed Feb. 28, 2017, now U.S. Pat. No. 10,015,501, which is a continuation of U.S. patent application Ser. No. 14/377,042, filed Aug. 6, 2014, now U.S. Pat. No. 9,621,906, which is a National Stage Application of International Application No. PCT/KR2013/011327, filed Dec. 9, 2013, which claims the benefit of U.S. Provisional Application No. 61/735,552, filed Dec. 10, 2012 and U.S. Provisional Application No. 61/754,625, filed on Jan. 20, 2013, which are hereby incorporated by reference in its entirety.

TECHNICAL FIELD

The present invention relates to a video compression technique, and more particularly, to a method and an apparatus for decoding video information in a bit stream.

BACKGROUND ART

Recently, demands for high-resolution and high-quality pictures have increased in various fields of applications. As pictures have higher resolution and higher quality, the amount of information on the pictures also increases.

With a growing amount of information, multi-functional devices and networks with various environments are introduced. Accordingly, the same content may be utilized with different levels of quality.

Specifically, as terminals are able to support diverse qualities of pictures and various network environments are established, a picture with general quality is enabled in one environment while a higher quality picture may be available in another environment.

For example, a user may enjoy video content purchased through a portable terminal on a large-screen display with higher resolution at home.

In recent years, as high definition (HD) broadcast services are available, a large number of users are getting used to high-resolution and high-quality videos and service providers and service users also pay attention to ultrahigh-definition (UHD) services having a resolution four times higher than HDTV.

Thus, there is a need to provide scalability to video quality, for example, the image quality, resolution, size and frame rate of a video, based on high-efficiency encoding and decoding methods on a high-capacity video so as to offer varied qualities of video services in different environments for users' demands.

DISCLOSURE

Technical Problem

An aspect of the present invention is to provide a method and apparatus for describing an additional extension information indication in a bit stream supporting a hierarchical video.

Another aspect of the present invention is to provide a method and apparatus for expressing an additional extension information indication and additional extension information.

Technical Solution

An embodiment of the present invention provides a video decoding method including receiving and parsing a parameter set including indication information specifying whether reserved information is for future used is present, receiving and parsing a slice header including the reserved information when the indication information specifies that the reserved information is present, and decoding a video based on semantics and a value corresponding to the reserved information.

The indication information may be received being included in a picture parameter set.

The indication information may be information specifying an extra slice header bit number added for the slice header to include the reserved information, and the extra slice header bit number may be 0 when a bit stream supports a single-layer video.

The indication information may be signalled at a position following a syntax element specifying a sequence parameter set (SPS) identifier (ID) of an SPS activated in the picture parameter set and a syntax element specifying whether flag information indicating whether the slice header is a dependent slice header is present.

The reserved information may include a number of semantics and values corresponding to the extra slice header bit number.

The reserved information may be received when a current slice is not a dependent slice.

The reserved information may be used for a multi-viewpoint layer and a video supporting spatial scalability or a three-dimensional (3D) video.

The indication information and the reserved information may be received being included in a payload of a network abstraction layer (NAL) unit.

Advantageous Effects

An embodiment of the present invention provides a method and apparatus for describing an additional extension information indication in a bit stream supporting a hierarchical video.

Another embodiment of the present invention provides a method and apparatus for expressing an additional extension information indication and additional extension information.

MODE FOR INVENTION

Figure 1:
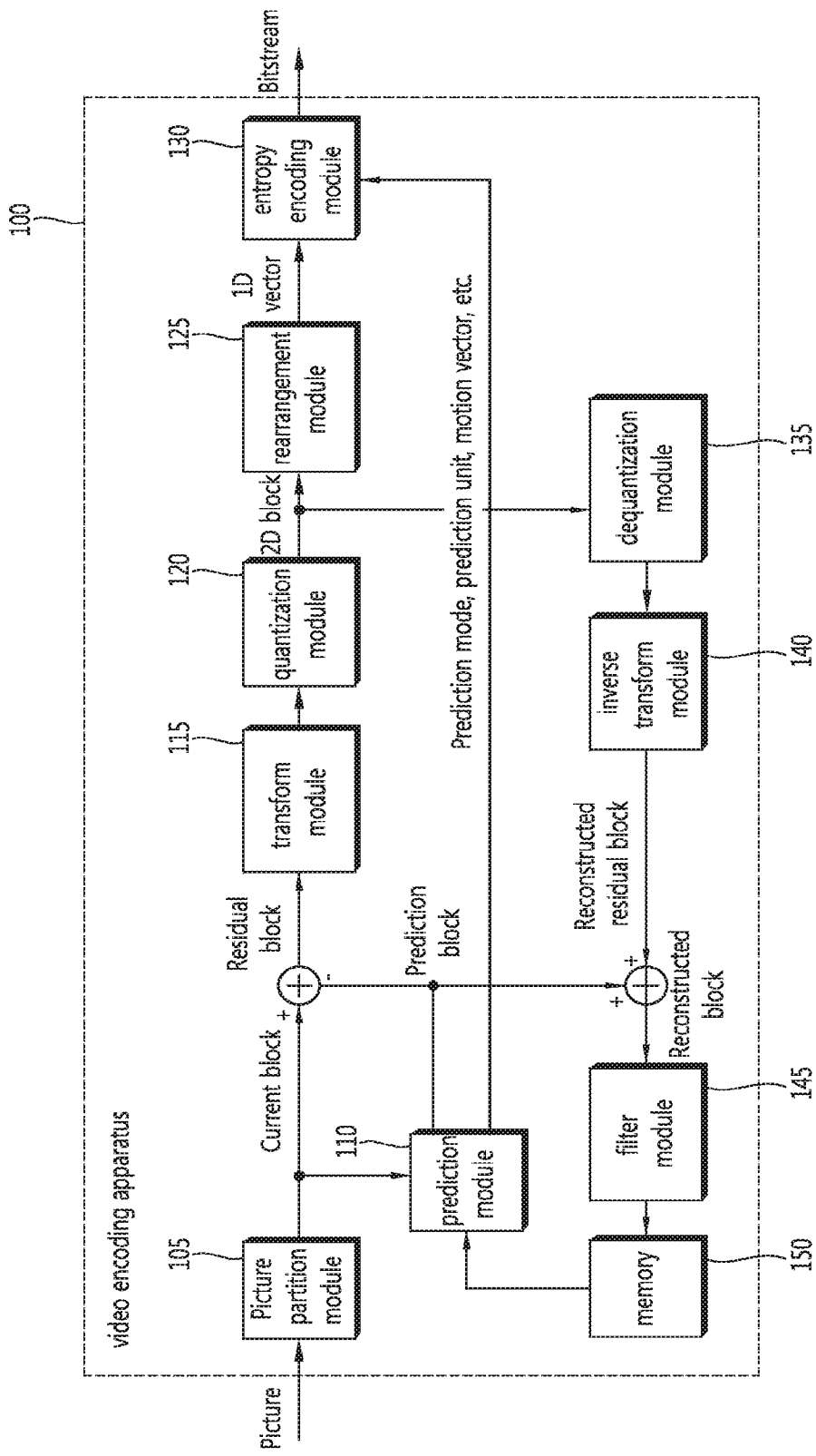
FIG. 1 is a block diagram schematically illustrating a video encoding apparatus according to an exemplary embodiment of the present invention.

The present invention may be changed and modified variously and be illustrated with reference to different exemplary embodiments, some of which will be described in detail and shown in the drawings. However, these embodiments are not intended for limiting the invention. The terminology used herein is for the purpose of describing particular embodiments only and is not intended to be limiting the technical idea of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components, and/or combinations thereof, but do not preclude the presence or addition of one or more other features, integers, steps, operations, elements, components, and/or combinations thereof.

Although elements illustrated in the drawings are independently shown for convenience of description of different distinctive functions in the video encoding apparatus/decoding apparatus, such a configuration does not indicate that each element is constructed by a separate hardware constituent or software constituent. That is, at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram schematically illustrating a video encoding apparatus according to an exemplary embodiment of the present invention. A scalable video encoding/decoding method or apparatus may be realized by extension of a general video encoding/decoding method or apparatus that does not provide scalability, and a scalable video encoding apparatus may be configured based on the video encoding apparatus FIG. 2.

Referring to FIG. 1, the video encoding apparatus 100 includes a picture partition module 105, a prediction module 110, a transform module 115, a quantization module 120, a rearrangement module 125, an entropy encoding module 130, a dequantization module 135, an inverse transform module 140, a filter module 145 and a memory 150.

The picture partition module 105 may divide an input picture into at least one block as a processing unit. Here, the block as the processing unit may be a prediction unit (PU), a transform unit (TU) or a coding unit (CU).

Processing unit blocks divided by the picture partition module 105 may have a quadtree structure.

The prediction module 110 may include an inter prediction module to perform inter prediction and an intra prediction module to perform intra prediction, which will be described. The prediction module 110 generates a prediction block by performing prediction on the processing unit of the picture from the partition module 105. The processing unit of the picture in the prediction module 110 may be a CU, a TU or a PU. Furthermore, the prediction module 110 may determine whether prediction performed on the processing unit is inter prediction or intra prediction, and may determine details (for example, a prediction mode) of each prediction method. Here, a processing unit for performing prediction may be different from a processing unit for determining a prediction method and details on the prediction method. For example, a prediction method and a prediction mode may be determined by PU, while prediction may be performed by TU.

In inter prediction, a prediction block may be generated by performing prediction based on information on at least one of previous and/or subsequent pictures of a current picture. In intra prediction, a prediction block may be generated by performing prediction based on information on a pixel within the current picture.

A skip mode, a merge mode or a motion vector prediction (MVP) mode may be used as an inter prediction method. In inter prediction, a reference picture for a PU may be selected, and a reference block corresponding to the PU may be selected. The reference block may be selected as a unit of inter pixel. Subsequently, a prediction block having a minimum residual signal from the current PU and a minimum-size motion vector is generated.

The prediction block may be generated as an integer sample unit or as a fractional pixel unit, such as a ½ pixel unit and a ¼ pixel unit. Here, the motion vector may be also represented in a fractional pixel.

Information including an index of the reference pixel selected in inter prediction, the motion vector (e.g., a motion vector predictor) and the residual signal, is entropy-encoded and transferred to a decoding apparatus. In the skip mode, since the prediction block may be a reconstructed block, the residual may not be generated, transformed, quantized and transferred.

In intra prediction, a prediction mode is determined by PU, and prediction may be performed by PU. Alternatively, a prediction mode may be determined by PU, and intra prediction may be performed in TU.

Intra prediction may include 33 directional prediction modes and two or more non-directional modes. The non-directional modes may include a DC prediction mode and a planar mode.

In intra prediction, the prediction block may be generated after applying a filter to a reference sample. Here, whether to apply the filter to the reference sample may be determined on an intra prediction mode and/or size of a current block.

A PU may be a block with different sizes/forms. For example, in inter prediction, a PU may be a 2N×2N, 2N×N, N×2N or N×N block (N is an integer). In intra prediction, a PU may be a 2N×2N or N×N block (N is an integer). Here, a PU having an N×N size may be applied only to a special case. For example, an N×N PU may be available only for a CU with a minimum size or only for intra prediction. In addition to the PUs with the foregoing sizes, a PU may include N×mN, mN×N, 2N×mN and mN×2N blocks (m<1).

A residual value (residual block or residual signal) between the generated prediction block and an original block is input to the transform module 115. Also, information on a prediction mode and a motion vector used for prediction are encoded along with the residual value by the entropy encoding module 130 and transferred to the decoding apparatus.

The transform module 115 transforms the residual block by a TU and generates a transform coefficient.

A transform block is a rectangular block of samples to which the same transformation is applied. The transform block may be a TU and have a quadtree structure.

The transform module 115 may perform transformation based on a prediction mode applied to the residual block and a size of the block.

For example, when intra prediction is applied to the residual block and the block has a 4×4 residual array, the transform module 115 may transform the residual block using discrete cosine transform (DCT). Otherwise, the transform module 115 may transform the residual block using discrete sine transform (DST).

The transform module 115 may generate a transform block of transform coefficients by transformation.

The quantization module 120 may quantize residual values transformed by the transform module 115, that is, the transform coefficients, to generate quantized transform coefficients. The coefficients generated by the quantization module 120 are provided to the dequantization module 135 and the rearrangement module 125.

The rearrangement module 125 rearranges the quantized transform coefficients provided by the quantization module 120. Rearranging the quantized transform coefficients may enhance encoding efficiency in the entropy encoding module 130.

The rearrangement module 125 may rearrange a two-dimensional (2D) block of the quantized transform coefficients into a one-dimensional (1D) vector using coefficient scanning.

The entropy encoding module 130 may entropy-encode the quantized transform coefficients rearranged by the rearrangement module 125. Various encoding methods, such as exponential Golomb, context-adaptive variable length coding (CAVLC) and context-adaptive binary arithmetic coding (CABAC), may be used for entropy encoding. The entropy encoding module 130 may encode various types of information, such as quantized transform coefficient information and block type information on a CU, prediction mode information, partition unit information, PU information, transfer unit information, motion vector information, reference picture information, block interpolation information and filtering information, received from the rearrangement module 125 and the prediction module 110.

If necessary, the entropy coding module 130 may also apply a change to a received parameter set or syntax.

The dequantization module 135 dequantizes the values quantized by the quantization module 120, that is, the quantized transform coefficients, and the inverse transform module 140 inverse-transforms the values dequantized by the dequantization module 135.

The residual values generated through the dequantization module 135 and the inverse transform module 140 are merged with the prediction block predicted by the prediction module 110, thereby generating a reconstructed block.

FIG. 1 illustrates that a reconstructed block is generated by merging a residual block with a prediction block through an adder. Here, the adder may be regarded as a separate module for generating a reconstructed block (reconstructed block generation module).

The filter module 145 may apply a deblocking filter, an adaptive loop filter (ALF), and a sample adaptive offset (SAO) to a reconstructed picture.

The deblocking filter may remove block distortion generated on boundaries between blocks in the reconstructed picture. The ALF may perform filtering based on a value obtained by comparing the reconstructed picture obtained by filtering blocks using the deblocking filter with the original picture. The ALF may be employed only for high efficiency. The SAO reconstructs an offset difference between the residual block to which the deblocking filter has been applied and the original picture by a pixel unit, in which a band offset or an edge offset is used.

Meanwhile, the filter module 145 may not apply filtering to a reconstructed block used in inter prediction.

The memory 150 may store the reconstructed block or picture obtained via the filter module 145. The reconstructed block or picture stored in the memory 150 may be provided to the prediction module 110 performing inter prediction.

Figure 2:
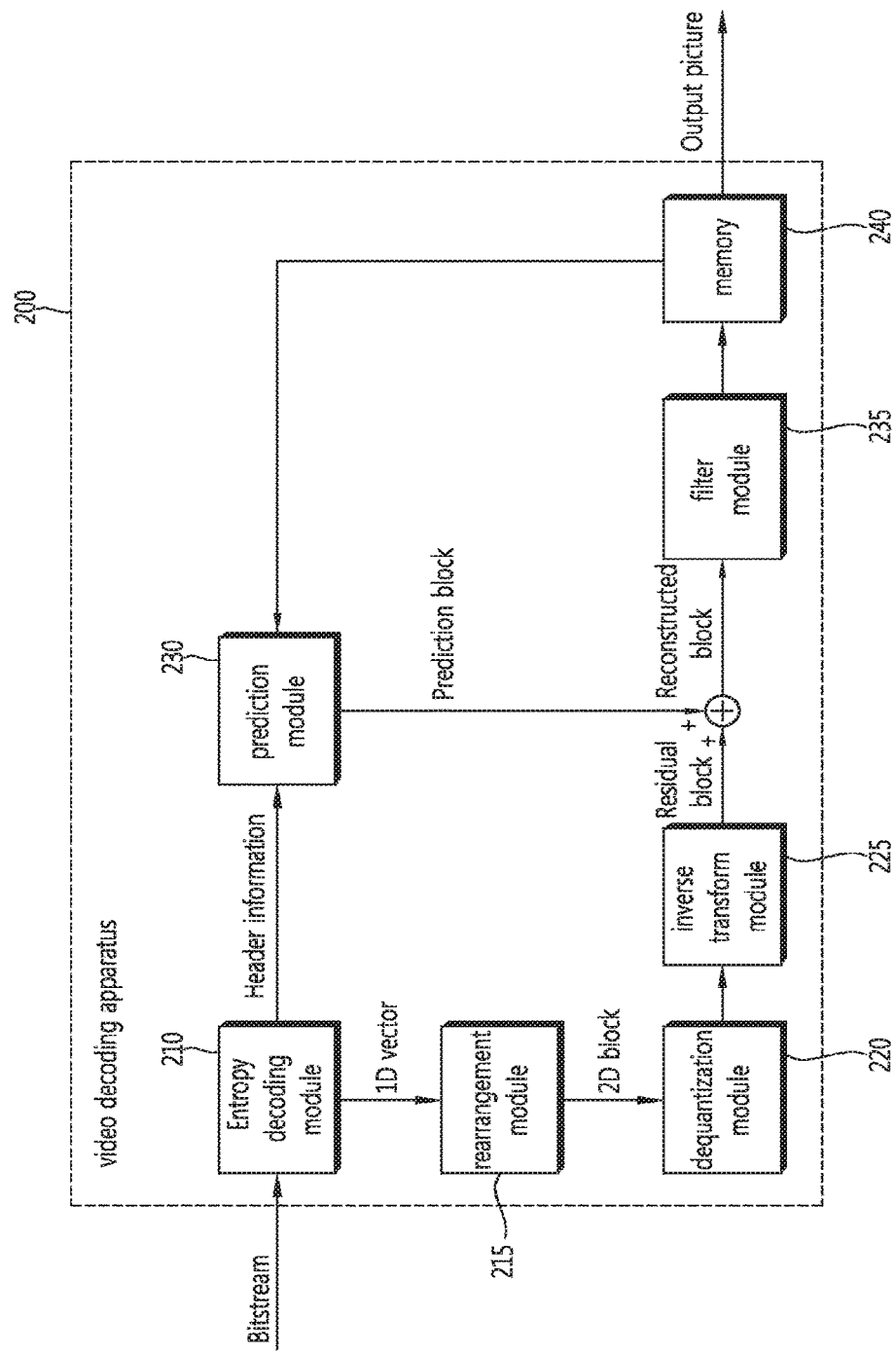
FIG. 2 is a block diagram schematically illustrating a video decoding apparatus according to an exemplary embodiment of the present invention.

FIG. 2 is a block diagram schematically showing a video decoding apparatus according to an exemplary embodiment of the present invention. As described above in FIG. 1, a scalable video encoding/decoding method or apparatus may be realized by extension of a general video encoding/decoding method or apparatus that does not provide scalability, and a scalable video decoding apparatus may be configured based on the video decoding apparatus FIG. 2.

Referring to FIG. 2, the video decoding apparatus 200 may include an entropy decoding module 210, a rearrangement module 215, an dequantization module 220, an inverse transform module 225, a prediction module 230, a filter module 235, and a memory 240.

When a video bit stream is input from the video encoding apparatus, the input bit stream may be decoded according to the same procedure for processing video information as used by the video encoding apparatus.

For example, if the video encoding apparatus uses variable length coding (VLC), such as CAVLC, to perform entropy encoding, the entropy decoding module 210 may perform entropy decoding by configuring the same VLC table as used in the encoding apparatus. Furthermore, if the video encoding apparatus uses CABAC to perform entropy ending, the entropy decoding module 210 may also perform entropy decoding using CABAC.

Information for generating a prediction block, among pieces of information decoded by the entropy decoding module 210, may be provided to the prediction module 230. Residual values entropy-decoded by the entropy decoding module 210, that is, quantized transform coefficients, may be input to the rearrangement module 215.

The rearrangement module 215 may rearrange information on the bit stream entropy-decoded by the entropy decoding module 210, that is, the quantized transform coefficients, based on a rearrangement method used in the encoding apparatus.

The rearrangement module 215 may reconstruct and rearrange a 1D vector of coefficients into a 2D block of coefficients. The rearrangement module 215 may scan coefficients based on a prediction mode of a current block (transform block) and a size of the transform block to generate a 2D block of coefficients (quantized transform coefficients).

The dequantization module 220 may perform dequantization based on a quantization parameter provided from the encoding apparatus and the rearranged coefficients of the block.

The inverse transform module 225 may perform inverse DCT and/or inverse DST on a result of quantization performed by the video encoding apparatus in response to DCT and DST performed by the transform module of the encoding apparatus.

Inverse transformation may be performed on the basis of a transfer unit or a partition unit of a picture determined by the video encoding apparatus. The transform module of the video encoding apparatus may selectively perform DCT and/or DST depending on a plurality of information elements, such as a prediction method, a size of the current block and a prediction direction, and the inverse transform module 225 of the video decoding apparatus may perform inverse transformation on the basis of information on the transformation performed by the transform module of the video encoding apparatus.

The prediction module 230 may generate a prediction block based on information on generation of the prediction block provided from the entropy decoding module 210 and information on a previously decoded block and/or picture provided by the memory 240.

When a prediction mode for a current PU is an intra prediction mode, intra prediction may be performed based on information on a pixel in a current picture to generate the prediction block.

When a prediction mode for the current PU is an inter prediction mode, inter prediction for the current PU may be performed based on information on at least one of previous and subsequent pictures of the current picture. Here, motion information necessary for the inter prediction for the current PU provided by the video encoding apparatus, for example, information on a motion vector and a reference picture index, may be derived by checking a skip flag and a merge flag received from the encoding apparatus.

A reconstructed block may be generated using the prediction block generated by the prediction module 230 and the residual block provided by the inverse transform module 225. FIG. 2 illustrates that the reconstructed block is generated by the adder merging the prediction block with the residual block. Here, the adder may be regarded as a separate module for generating the reconstructed block (reconstructed block generation module).

When the skip mode is used, the prediction block may be the reconstructed block without transmitting the residual block.

The reconstructed block and/or picture may be provided to the fitter module 235. The filter module 235 may apply deblocking filtering, SAO and/or AFL to the reconstructed block and/or picture.

The memory 240 may store the reconstructed picture or block to be used as a reference picture or a reference block and supply the reconstructed picture to an output unit.

Components directly related to video decoding among the entropy decoding module 210, the rearrangement module 215, the dequantization module 220, the inverse transform module 225, the prediction module 230, the filter module 235 and the memory 240 of the decoding apparatus 200, for example, the entropy decoding module 210, the rearrangement module 215, the dequantization module 220, the inverse transform module 225, the prediction module 230 and the filter module 235 may be defined as a decoder or a decoding unit, separately from the other components.

Further, the decoding apparatus 200 may further include a parsing module (not shown) to parse information about an encoded video included in the bit stream. The parsing module may include the entropy decoding module 210 or be included in the entropy decoding module 210. The parsing module may be provided as one component of the decoding unit.

Figure 3:
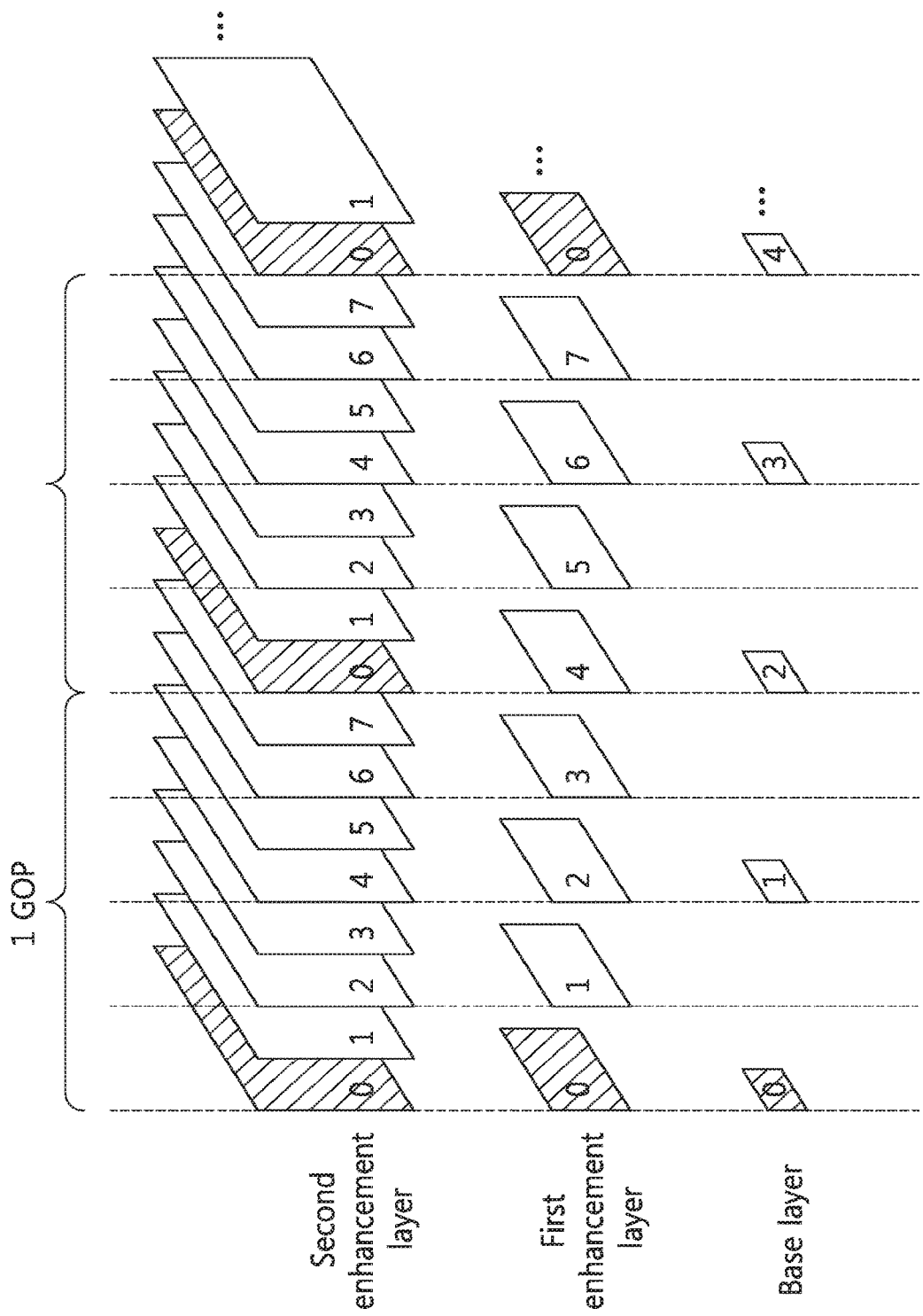
FIG. 3 is a conceptual diagram schematically illustrating a scalable video coding structure using a plurality of layers according to an exemplary embodiment of the present invention.

FIG. 3 is a conceptual diagram schematically illustrating a scalable video coding structure using a plurality of layers according to an exemplary embodiment of the present invention. In FIG. 3, Group of Picture (GOP) denotes a picture group, that is, a group of pictures.

In order to transmit video data, a transmission medium is needed, and performance thereof is different by each transmission medium according to various network environments. For application to various transmission media or network environments, a scalable video coding method may be provided.

The scalable video coding method is a coding method which utilizes texture information, motion information, residual signals between layers, or the like to remove redundancy between layers, thus improving encoding and decoding performance. The scalable video coding method may provide scalability in various spatial, temporal, and quality aspects according to ambient conditions such as a transmission bit rate, a transmission error rate, and a system resource.

Scalable video coding may be performed by using a multi-layer structure so as to provide a bit stream applicable to various network situations. For example, the scalable video coding structure may include a base layer in which video data is compressed and processed using a general video decoding method, and also include an enhancement layer in which video data is compressed and processed using both decoding information of the base layer and a general video decoding method.

Here, a layer refers to a set of pictures and bit streams that are classified according to a spatial aspect (for example, picture size), a temporal aspect (for example, decoding order, picture output order and frame rate), picture quality, complexity, or the like. Further, the base layer may mean a reference layer or a basic layer, and the enhancement layer may mean an enhancing layer. A plurality of layers may have dependency on each other.

Referring to FIG. 3, for example, the base layer may be defined by standard definition (SD), 15 Hz frame rate and 1 Mbps bit rate, a first enhancement layer may be defined by high definition (HD), 30 Hz frame rate and 3.9 Mbps bit rate, and a second enhancement layer may be defined by 4K-ultra high definition (UHD), 60 Hz frame rate and 27.2 Mbps. These formats, frame rates and bit rates are provided only for illustrative purposes and may be changed and modified as needed. Also, a number of used layers may change depending on circumstances, without being limited to the present embodiment.

For instance, when a transmission bandwidth is 4 Mbps, the first enhancement layer HD may be transmitted at a frame rate reduced to 15 Hz or lower. The scalable video coding method may provide spatial, temporal, and quality scalabilities using the method described above with reference to FIG. 3.

Scalable video coding refers to scalable video encoding in encoding, and to scalable video decoding in a decoding.

As described above, scalability is an important function in current video formats due to heterogeneous communications networks and various types of terminals.

Meanwhile, a bit stream including a plurality of layers is formed of network abstraction layer (NAL) units which facilitates adaptive transmission of videos through a packet-switching network. Similar to a plurality of layers, in multi-view video coding including a plurality of multi-view pictures in a bit stream, relationship between a plurality of viewpoints is similar to relationship between spatial layers in a video supporting a plurality of layers.

Figure 4:
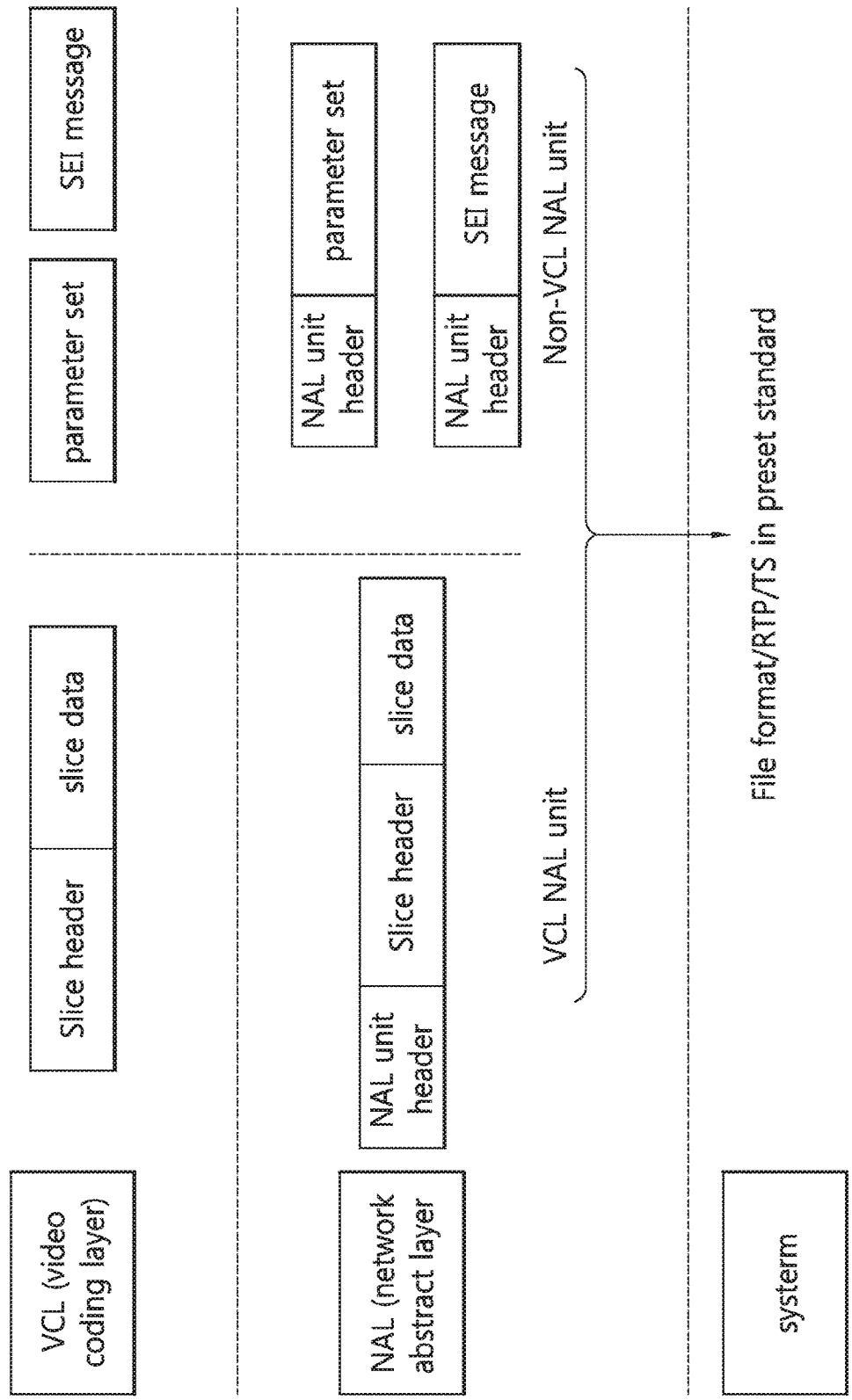
FIG. 4 illustrates a layered structure of a coded video processed by a decoding apparatus according to the present invention.

FIG. 4 illustrates a layered structure of a coded video processed by a decoding apparatus.

The coded video is divided into a video coding layer (VCL) responsible for decoding a video and dealing with the video itself and an NAL located between the VCL and a lower system, the lower system transmitting and storing encoded information.

An NAL unit as a basic unit of the NAL serves to map the coded video onto a bit string of the lower system, such as a file format in accordance with a preset standard, a real-time transport protocol (RTP) and a transport stream (TS).

Meanwhile, the VCL, are classified into a parameter set (picture parameter set, sequence parameter set and video parameter set) corresponding to a header of a sequence and a picture and a supplemental enhancement information (SEI) message additionally needed for video decoding, and information on the video (slice data). The VCL including the information on the video includes slice data and a slice header.

As shown in FIG. 4, the NAL unit includes two parts of an NAL header and a raw byte sequence payload (RBSP, resulting data from video compression) generated in the VCL. The NAL header includes information on a type of the corresponding NAL unit.

The NAL unit is divided into a VCL NAL unit and a non-VCL NAL unit depending on the RBSP generated in the VCL. The VCL NAL unit is an NAL unit including the information on the video, and the non-VCL NAL unit is an NAL unit including the information (parameter set or SEI message) needed for decoding the video.

A VCL NAL unit may be divided into different types according to properties and types of a picture included in the NAL unit.

The present invention discloses a method of effectively describing and signalling scalability information on a video in a bit stream capable of supporting a plurality of layers and an apparatus implementing the same.

In the following description, bit streams are classified into two types for convenience of description. A bit stream supporting temporal scalability only is referred to as a base type, while a bit stream supporting spatial, quality and viewpoint scalability in addition to temporal scalability is referred to as an extended type.

Scalability information on a bit stream is very important in order to effectively and efficiently convert the bit stream at all nodes in a content delivery path. In high efficiency video coding (HEVC) as a current video coding standard for a single layer, an NAL unit header has a length of 2 bytes, that is, a fixed length of 16 bits. A syntax element of the NAL unit header is illustrated in Table 1.

TABLE 1

|  | Descriptor |
|---|---|
| nal_unit_header( ) { |  |
|   forbidden_zero_bit | f(1) |
|   nal_unit_type | u(6) |
|   nuh_reserved_zero_6bits | u(6) |
|   nuh_temporal_id_plus1 | u(3) |
| } |  |

In Table 1, among information included in the NAL unit header, forbidden_zero_bit shall be 0.

nal_unit_type specifies the type of RBSP data structure contained included in an NAL unit and is provided in a plurality of types based on the data structure of the RBSP.

nuh_reserved_zero_6 bits, as information available tor an extended type supporting scalability such as a three-dimensional (3D) video coding extended type, is used to identify additional layers present in a coded video sequence (CVS). Such layers may include a spatially scalable layer, a quality-scalable layer, a texture view or a depth view.

When a bit stream is a base type, nuh_reserved_zero_6 bits is 0, which may be used to determine an amount of data included in a decoding unit of the bit stream.

A value specified by nuh_temporal_id_plus1 refers to an identifier (ID) of a temporal layer for an NAL unit. A temporal layer specifies a layer of a bit stream formed of a VCL NAL unit and temporally scalable, and has a specific temporal_id value.

The design of the NAL unit header shown in Table 1 for expressing an extended version for a video of a plurality of layers based on video coding for a single layer is very limited. Further, the NAL unit header of Table 1 allows a minimum change only.

A base-type bit stream supports temporal scalability only, which is described by syntax temporal_id. However, in an extended type, layer information or dependency information needs to be included in an NAL unit header, and nuh_reserved_zero_6 bits, which is not used for the base type, is used to transmit such information. For example, for a video supporting a multilayer, such as scalable extension or 3D video extension, nuh_reserved_zero_6 bits may be used to identify a layer of an NAL unit.

Among syntax elements of the NAL unit header, only nuh_reserved_zero_6 bits may be changed in order to signal additional information requested for the extended type. However, only nuh_reserved_zero_6 bits may be insufficient to transmit all information requested for the extended type. For an extended type of video, additional information, indications and flags need to be necessarily signalled in an NAL unit header level/transmission layer level.

For instance, indication information specifying whether a slice/picture of a current NAL unit payload is necessary for prediction of a slice/picture in an upper layer, that is, an upper scalability layer, indication information specifying whether a slice/picture of a current NAL unit payload is necessary for prediction of a slice/picture of another viewpoint layer, and indication information specifying a slice/picture of a current NAL unit payload is necessary for prediction of a slice/picture with the same scalability as needed for an upper layer/another viewpoint layer need signalling.

Although signalling the additional information is necessary, the NAL unit header has a limited length of 2 bytes and all bits of the NAL unit header are already used for signalling other information, and thus there is no space for signalling the additional information.

Thus, a structure for extending a space of the NAL unit header is needed to transmit the additional information/flag. Hereinafter, a flag extension structure of the NAL unit header for signalling information/flags, which are not signalled in the NAL unit header, will be described.

Final semantics is not yet determined for some reserved flags for an extended type, for example, syntax element slice_reserved_undetermined_flag [i]. A reserved flag specifies reserved information currently unspecified to be used later for the extended type and may have semantics and a value corresponding to information to be signalled. That is, the reserved flag refers to an extra bit for additional information signalling, not to flag information indicating true or false. Hereinafter, signalling a reserved flag which is not signalled in an NAL unit header, that is, a flag for an extended type, will be described using a term "NAL unit header flag extension."

In the present invention, for parsing a reserved flag, not only an NAL unit header but up to an NAL unit payload following the NAL unit header is also parsed. That is, the term "NAL unit header flag extension" may be also used to mean that a process of parsing and decoding a reserved flag is extended.

Meanwhile, a current reserved flag, such as slice_reserved_undetermined_flag [i], are signalled, being too far away from a start of a slice header, and accordingly it is difficult to find, parse and detect the flag at an application terminal. Further, slice_reserved_undetermined_flag [i] may be present or absent and thus is signalled after another syntax element which may cause difficulty in determining an accurate position of a flag, making it difficult to process the reserved flag. Thus, the reserved flag, such as slice_reserved_undetermined_flag [i], has difficulty in accepting an idea of an NAL unit header flag extension.

The following embodiments of the present invention consider modifications of signalling slice_reserved_undetermined_flag [i] so as to applying the idea of the NAL unit header flag extension. That is, the present invention extends a space of an NAL unit header to suggest an NAL unit header flag extension, thereby accepting more information/indications.

Figure 5:
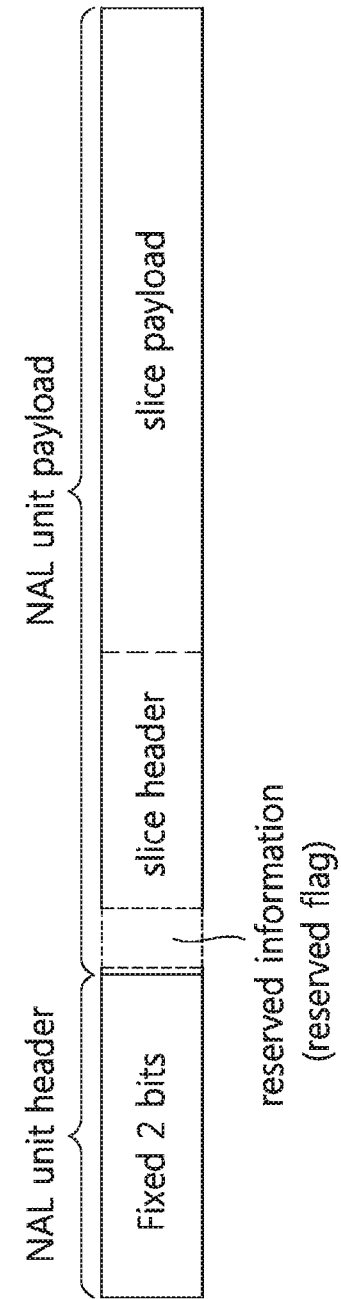
FIG. 5 illustrates an NAL unit header flag extension of a VCL NAL unit according to an exemplary embodiment of the present invention.
Figure 6:
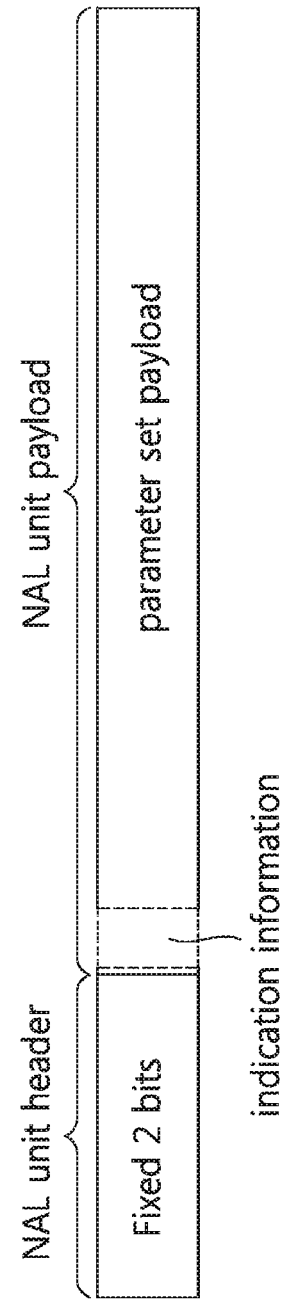
FIG. 6 illustrates an NAL unit header flag extension of a non-VCL NAL unit according to an exemplary embodiment of the present invention.

FIGS. 5 and 6 illustrate an NAL unit header flag extension according to exemplary embodiments of the present invention. FIG. 5 illustrates an NAL unit header flag extension of a VCL NAL unit including video information, and FIG. 6 illustrates an NAL unit header flag extension of a non-VCL NAL unit including information necessary for decoding a video (parameter set or SEI message).

As shown in FIGS. 5 and 6, NAL unit headers have a fixed bit number of 2 bytes, and an NAL unit payload, signalled subsequent to the NAL unit headers, includes a slice header and a slice payload in the VCL NAL unit and includes a parameter set payload in the non-VCL NAL unit.

Concepts of the NAL unit header flag extensions according to the present invention may be described as follows with reference to FIGS. 5 and 6.

No gap is allowed between an end of the NAL unit headers and the NAL unit payloads. The NAL unit payload of the VCL NAL unit includes the slice header and the slice payload.

An extended flag of the NAL unit header flag extension substantially belongs to the slice header or is part of the slice header. The extended flag may include a reserved flag.

The extended flag of the NAL unit header flag extension is signalled at an earliest possible position in the slice header. Here, the extended flag of the NAL unit header flag extension may not necessarily start at a first bit of the slice header.

Indication information specifying whether the extended flag is present in the slice header may be included in a parameter set, such as video parameter set (VPS), sequence parameter set (SPS) or picture parameter set (PPS). Here, parameter set including the indication information may be selectively applied.

As shown in FIGS. 5 and 6, the extended flag, that is, a reserved flag, may be signalled in two separate parts.

A first part is a signalling structure for indicating whether the NAL unit header flag is extended as shown in FIG. 5, in which this indication information may be signalled, being included in one of parameter sets, such as a VPS, an SPS and a PPS. A second part is a structure of signalling the NAL unit header flag extension in the slice header.

That is, the first part may signal whether the reserved flag is present, while the second part may signal the reserved flag.

In this signalling structure, a plurality of options may be applied to the two parts, in which an option of the first part may be combined with an option of the second part, and vice versa.

First Part: Signalling Structure for Indicating NAL Unit Header Flag Extension

Indication information on whether an NAL unit header flag extension is present may be signalled with num_extra_slice_header_bits as a syntax element specifying with how many bits the NAL unit header flag extension, that is, an extended flag, is signalled in the slice header.

num_extra_slice_header_bits specifies a number of extra slice header bits possibly present in a slice header RBSP for a coded picture.

The extra bit number (num_extra_slice_header_bits) set to 0 specifies that no extra bit is signalled in the slice header. That is, the NAL unit header flag extension, that is, a reserved flag, is absent. The extra bit number may be limited to a specific value and be clearly restricted to be easily parsed. For instance, three bits, such as u(3), may be given.

Various options may be present regarding a position at which num_extra_slice_header_bits is signalled.

First Part—Option 1

According to option 1, num_extra_slice_header_bits may be signalled via a PPS and disposed at an earliest possible position in the PPS.

When num_extra_slice_header_bits is included in the PPS, num_extra_slice_header_bits may be signalled at a position right after an SPS ID in the PPS or at a position right after dependent_slice_segments_enabled_flag in the PPS.

Here, num_extra_slice_header_bits needs to have the same value in all PPSs of the same sequence.

The PPS according to the present option has syntax elements listed in Table 2 or Table 3.

TABLE 2

|  | Descriptor |
| --- | --- |
| pic_parameter_set_rbsp( ) { |  |
|    pic_parameter_set_id | ue(v) |
|    seq_parameter_set_id | ue(v) |
|    num_extra_slice_header_bits | u(3) |
|    dependent_slice_segments_enabled_flag | u(1) |
|    ... |  |
| } |  |

Referring to Table 2, pic_parameter_set_id specifies a PPS ID to identify a PPS referenced by another syntax element.

seq_parameter_set_id specifies an SPS ID of an activated SPS.

num_extra_slice_header_bits equal to 0 specifies that no extra slice header bit is present in a slice header RBSP for a coded picture referenced in the PPS, and num_extra_slice_header_bits is 0 for a bit stream supporting a single-layer video. Another value for num_extra_slice_header_bits is reserved for future use in an extended type of video.

dependent_slice_segments_enabled_flag equal to 1 specifies that dependent_slice_segment_flag is present in a slice segment header for a coded picture referring to the PPS, while dependent_slice_segments_enabled_flag equal to 0 specifies that dependent_slice_segment_flag is not present in the slice segment header for the coded picture referring to the PPS.

In Table 2, num_extra_slice_header_bits is disposed and signalled subsequent to SPS ID seq_parameter_set_id signalling an SPS ID.

TABLE 3

|  | Descriptor |
|---|---|
| pic_parameter_set_rbsp( ) { |  |
|     pic_parameter_set_id | ue(v) |
|     seq_parameter_set_id | ue(v) |
|     dependent_slice_segments_enabled_flag | u(1) |
|     num_extra_slice_header_bits | u(3) |
|     ... |  |
| } |  |

Referring to Table 3, num_extra_slice_header_bits is disposed and signalled right after dependent_slice_segments_enabled_flag disposed next to seq_parameter_set_id signalling the SPS ID.

First Part—Option 2

According to the present option, num_extra_slice_header_bits may be signalled via an SPS and be disposed at an earliest possible position in the SPS.

When num_extra_slice_header_bits is included in the SPS, num_extra_slice_header_bits may be signalled at a position of a first syntax element of the SPS, at a position right after video_parameter_set_id, or at a position right after sps_max_sub_layers_minus1 or a position right after sps_temporal_id_nesting_flag.

The SPS according to the present option may have syntax elements listed in Tables 4 to 7.

TABLE 4

|  | Descriptor |
|---|---|
| seq_parameter_set_rbsp( ) { |  |
|     num_extra_slice_header_bits | u(3) |
|     video_parameter_set_id | u(4) |
|     sps_max_sub_layers_minus1 | u(3) |
|     sps_temporal_id_nesting_flag | u(1) |
|     ... |  |
| } |  |

Referring to Table 4, num_extra_slice_header_bits equal to 0 specifies that no extra slice header bit is present in a slice header RBSP for a coded picture referenced in a PPS, and num_extra_slice_header_bitsneeds is 0 for a bit stream supporting a single-layer video. Another value for num_extra_slice_header_bits is reserved for future use in an extended type of video.

video_parameter_set_id specifies a VPS ID of an activated VPS.

A value of sps_max_sub_layers_minus1 plus 1 specifies a maximum number of temporal sub-layers possibly present in each CVS referring to the SPS, sps_max_sub_layers_minus1 may have a value ranging from 0 to 6.

sps_temporal_id_nesting_flag greater than 0 specifies whether an additional restriction is present for the CVS referring to the SPS in inter prediction. If vps_temporal_id_nesting_flag is 1, sps_temporal_id_nesting_flag shall be 1. If sps_max_sub_layers_minus1 is 0, sps_temporal_id_nesting_flag shall be 1. sps_temporal_id_nesting_flag is a syntax element used for indicating temporal up switching, and for example, switching of decoding up TemporalId as a temporal sub-layer ID from tIdN to tIdM greater than tIdN is always possible in the CVS.

In Table 4, num_extra_slice_header_bits may be signalled as the first syntax element of the SPS.

TABLE 5

|  | Descriptor |
|---|---|
| seq_parameter_set_rbsp( ) { |  |
|     video_parameter_set_id | u(4) |
|     num_extra_slice_header_bits | u(3) |
|     sps_max_sub_layers_minus1 | u(3) |
|     sps_temporal_id_nesting_flag | u(1) |
|     ... |  |
| } |  |

In Table 5, num_extra_slice_header_bits may be signalled at a position right after video_parameter_set_id representing the VPS ID.

TABLE 6

|  | Descriptor |
|---|---|
| seq_parameter_set_rbsp( ) { |  |
|     video_parameter_set_id | u(4) |
|     sps_max_sub_layers_minus1 | u(3) |
|     num_extra_slice_header_bits | u(3) |
|     sps_temporal_id_nesting_flag | u(1) |
|     ... |  |
| } |  |

In Table 6, num_extra_slice_header_bits may be signalled at a position right after sps_max_sub_layers_minus1.

TABLE 7

|  | Descriptor |
|---|---|
| seq_parameter_set_rbsp( ) { |  |
|     video_parameter_set_id | u(4) |
|     sps_max_sub_layers_minus1 | u(3) |
|     sps_temporal_id_nesting_flag | u(1) |
|     num_extra_slice_header_bits | u(3) |
|     ... |  |
| } |  |

In Table 7, num_extra_slice_header_bits may be signalled at a position right after sps_temporal_id_nesting_flag.

First Part—Option 3

According to the present option, num_extra_slice_header_bits may be signalled via a VPS and disposed at an earliest possible position in the VPS.

When num_extra_slice_header_bits is included in the VPS, num_extra_slice_header_bits may be signalled at a position right after video_parameter_set_id or at a position right after vps_max_sub_layers_minus1.

The VPS according to the present option has syntax elements as listed in Tables 8 and 9.

TABLE 8

| | Descriptor |
|---|---|
| video_parameter_set_rbsp( ) { | |
|    video_parameter_set_id | u(4) |
|    num_extra_slice_header_bits | u(3) |
|    ... | |
|    vps_max_sub_layers_minus1 | u(3) |
|    ... | |
| } | |

Referring to Table 8, video_parameter_set_id specifies a VPS ID referenced by other syntax elements.

num_extra_slice_header_bits equal to 0 specifies no extra slice header bit is present in a slice header RBSP for a coded picture referenced in a PPS, and num_extra_slice_header_bits is be 0 for a bit stream supporting a single-layer video. Another value for num_extra_slice_header_bits is reserved for future use in an extended type of video.

A value of vps_max_sub_layers_minus1 plus 1 specifies a maximum number of temporal sub-layers possibly present in a bit stream. vps_max_sub_layers_minus1 may have a value ranging from 0 to 6.

As in Table 8, num_extra_slice_header_bits may be signalled at a position right after video_parameter_set_id representing the VPS ID.

TABLE 9

| | Descriptor |
|---|---|
| video_parameter_set_rbsp( ) { | |
|    video_parameter_set_id | u(4) |
|    ... | |
|    vps_max_sub_layers_minus1 | u(3) |
|    num_extra_slice_header_bits | u(3) |
|    ... | |
| } | |

In Table 9, num_extra_slice_header_bits may be signalled at a position right after vps_max_sub_layers_minus1.

First Part—Option 4

According to the present option, the indication information illustrated in Options 1 to 3 is not included in any parameter set.

Information on whether an extra bit is present in a slice segment header is signalled by a slice header itself. According to such signalling structure, the decoding apparatus may obtain the information on the extra it without dependency on parsing of a parameter set, that is, without depending on parsing of the parameter set.

The slice segment header includes flags listed in Table 10.

TABLE 10

| | Descriptor |
|---|---|
| slice_segment_header( ) { | |
|    first_slice_segment_in_pic_flag | u(1) |
|    if( RapPicFlag ) | |
|       no_output_of_prior_pics_flag | u(1) |
|    num_extra_slice_header_bits | ue(v) |
|    for ( i = 0; i < num_extra_slice_header_bits; i++ ) | |

TABLE 10-continued

| | Descriptor |
|---|---|
|       extension_flag_slice_header [ i ] | u(1) |
|    pic_parameter_set_id | ue(v) |
|    ... | |
| } | |

Referring to 10, first_slice_segment_in_pic_flag equal to 1 specifies that a current slice segment is a first slice segment in decoding order, while first_slice_segment_in_pic_flag equal to 0 specifies that the slice segment is not the first slice segment in decoding order.

no_output_of_prior_pics_flag affects output of a previously decoded picture in a decoded picture buffer (DPB) after an instantaneous decoding refresh (IDR) picture or broken link access (BLA) picture is decoded among random access point pictures other than a first picture in a bit stream.

num_extra_slice_header_bits equal to 0 specifies that no extra slice header bit is present in a slice header RBSP for a coded picture referenced in a PPS, and num_extra_slice_header_bits is 0 for a bit stream supporting a single-layer video. Another value for num_extra_slice_header_bits is reserved for future use in an extended type of video.

extension_flag_slice_header [i] has semantics and a value reserved for future use. That is, extension_flag_slice_header [i] is a reserved flag, which may have a number of semantics and values corresponding to num_extra_slice_header_bits.

pic_parameter_set_id specifies a value of pps_pic_parameter_set for a used PPS, which may range from 0 to 63.

In Table 10, num_extra_slice_header_bits representing a number of extended flags, that is, reserved flags, extension_flag_slice_header [i] is signalled in the slice header.

First Part—Option 5

According to the present option, the indication information illustrated in Options 1 to 3 is not included in any parameter set.

Information on whether an extra bit is present in a slice segment header is signalled by a slice header itself. According to such signalling structure, the decoding apparatus may obtain the information on the extra bit without dependency on parsing of a parameter set, that is, without depending on parsing of the parameter set.

The slice segment header includes flags listed in Table 11.

TABLE 11

| | Descriptor |
|---|---|
| slice_segment_header( ) { | |
|    first_slice_segment_in_pic_flag | u(1) |
|    if( RapPicFlag ) | |
|       no_output_of_prior_pics_flag | u(1) |
|    num_extra_slice_header_bits | u(3) |
|    for ( i = 0; i < num_extra_slice_header_bits; i++ ) | |
|       extension_flag_slice_header [ i ] | u(1) |
|    pic_parameter_set_id | ue(v) |
|    ... | |
| } | |

Referring to Table 11, num_extra_slice_header_bits is signalled, being included in the slice header, and has a fixed bit number of 3 bits unlike in Table 10.

First Part—Option 6

According to the present option, the indication information illustrated in Options 1 to 3 is not included in any parameter set.

Information on whether an extra bit is present in a slice segment header is signalled by a slice header itself. According to such signalling structure, the decoding apparatus may obtain the information on the extra bit without dependency on parsing of a parameter set, that is, without depending on parsing of the parameter set.

The slice segment header includes flags listed in Table 12.

TABLE 12

| | Descriptor |
|---|---|
| slice_segment_header( ) { | |
|     first_slice_segment_in_pic_flag | u(1) |
|     if( RapPicFlag ) | |
|         no_output_of_prior_pics_flag | u(1) |
|     extra_slice_header_bits_present_flag | u(1) |
|     if (extra_slice_header_bits_present_flag) { | |
|         num_extra_slice_header_bits | u(3) |
|         for ( i = 0; i < num_extra_slice_header_bits; i++ ) | |
|             extension_flag_slice_header [ i ] | u(1) |
|     } | |
|     pic_parameter_set_id | ue(v) |
|     ... | |
| } | |

Referring to Table 12, extra_slice_header_bits_present_flag is further signalled in addition to Table 10.

extra_slice_header_bits_present_flag equal to 0 specifies that extension_flag_slice_header [i] is not present. Meanwhile, extension_flag_slice_header [i] equal to 1 specifies that extension_flag_slice_header [i] is present.

That is, according to the present option, extra_slice_header_bits_present_flag is signalled in addition to num_extra_slice_header_bits representing a number of extended flags. In Table 12, if extra_slice_header_bits_present_flag is 1, num_extra_slice_header_bits is signalled and a reserved flag extension_flag_slice_header [i] is signalled corresponding to the signalled num_extra_slice_header_bits.

Second Part: Signalling Structure for NAL Unit Header Flag Extension in Slice Header An extended flag (reserved flag) present or included in a slice header may be represented by syntax element extension_flag_slice_header [i].

If an extended flag is present, that is, num_extra_slice_header_bits>0, the extended flag needs to be signalled as quickly as possible in the slice header. That is, the flag may be signalled in the slice header at least before a PPS ID (i.e., pic_parameter_set_id) is signalled.

extension_flag_slice_header [i] as a syntax element representing an extended flag may be signalled with an alternative expression, such as syntax elements slice_reserved_undetermined_flag [i] or slice_reserved_flag [i], and meanings thereof are the same.

Meanwhile, the extended flag may involve a plurality of options relating to slice segment dependency as follows.

Second Part—Option 1

According to option 1 of the second part, even though a current slice has dependency on a slice segment, an extended flag may be signalled when num_extra_slice_header_bits is greater than 0.

A slice header according to the present option has syntax elements listed in Table 13.

TABLE 13

| | Descriptor |
|---|---|
| slice_segment_header( ) { | |
|     first_slice_segment_in_pic_flag | u(1) |
|     if( RapPicFlag ) | |
|         no_output_of_prior_pics_flag | u(1) |
|     for ( i = 0; i < num_extra_slice_header_bits; i++ ) | |
|         extension_flag_slice_header [ i ] | u(1) |
|     pic_parameter_set_id | ue(v) |
|     ... | |
| } | |

Referring to Table 13, first_slice_segment_in_pic_flag equal to 1 specifies that that a current slice segment is a first slice segment in decoding order, while first_slice_segment_in_pic_flag equal to 0 specifies that the slice segment is not the first slice segment in decoding order.

no_output_of_prior_pics_flag affects output of a previously decoded picture in a DPB after an IDR picture or BLA picture is decoded among random access point pictures other than a first picture in a bit stream.

extension_flag_slice_header [i] has semantics and a value reserved for future use. That is, extension_flag_slice_header [i] is a reserved flag, which may have a number of semantics and values corresponding to num_extra_slice_header_bits.

pic_parameter_set_id specifies a value pps_pic_parameter_set for a used PPS, which may range from 0 to 63.

In Table 13, the slice header according to the present option does not include information indicating whether the current slice has dependency on the slice segment, and extension_flag_slice_header corresponding to reserved flag information is signalled only corresponding to num_extra_slice_header_bits.

Second Part—Option 2

According to option 2 of the second part, when num_extra_slice_header_bits is greater than 0 and a current slice has no dependency on a slice segment, that is, the current slice is not a dependent slice segment, an extended flag is signalled.

In this case, information indicating whether the current slice is a dependent slice segment needs to be present at a decodable position before the extended flag is signalled.

A slice header according to the present option has syntax elements listed in Table 14 or 15.

TABLE 14

| | Descriptor |
|---|---|
| slice_segment_header( ) { | |
|     first_slice_segment_in_pic_flag | u(1) |
|     if( RapPicFlag ) | |
|         no_output_of_prior_pics_flag | u(1) |
|     for ( i = 0; i < num_extra_slice_header_bits | |
|     && !dependent_slice_segment_flag; i++ ) | |
|         extension_flag_slice_header [ i ] | u(1) |
|     pic_parameter_set_id | ue(v) |
|     ... | |
| } | |

Referring to Table 14, extension_flag_slice_header [i] is signalled only when num_extra_slice_header_bits is signalled and dependent_slice_segment_flag is not 1.

If dependent_slice_segment_flag, which is a syntax element included and signalled in the slice header, is 1, a syntax element value of each slice segment header is not present and inferred from syntax element values of a corresponding slice segment header in the slice header. Here, a corresponding slice segment header refers to an independent slice segment header. A dependent slice may be defined to use information on an independent slice segment by corresponding to an address of an independent slice.

That is, dependent_slice_segment_flag equal to 1 specifies that the current slice is a dependent slice.

TABLE 15

|  | Descriptor |
| --- | --- |
| slice_segment_header( ) { | |
|     first_slice_segment_in_pic_flag | u(1) |
|     if( RapPicFlag ) | |
|         no_output_of_prior_pics_flag | u(1) |
|     for ( i = 0; i < num_extra_slice_header_bits | |
|     && !DependentSliceSegmentFlag; i++ ) | |
|         extension_flag_slice_header [ i ] | u(1) |
|     pic_parameter_set_id | ue(v) |
|     ... | |
| } | |

Referring to Table 15, extension_flag_slice_header [i] is signalled only when num_extra_slice_header_bits is signalled and DependentSliceSegmentFlag is not 1.

DependentSliceSegmentFlag is a variable set using a syntax element, such as dependent_slice_segment_flag, which may indicate whether the current slice is a dependent slice.

Second Part—Option 3

Option 3, which is an extension of signalling illustrated in Options 4 to 6 of the first part, suggests a multi-step structure for signalling an extended flag (reserved flag) in a slice header.

The slice header according to the present option has syntax elements listed in Table 16.

TABLE 16

|  | Descriptor |
| --- | --- |
| slice_segment_header( ) { | |
|     first_slice_segment_in_pic_flag | u(1) |
|     if( RapPicFlag ) | |
|         no_output_of_prior_pics_flag | u(1) |
|     extra_slice_header_bits_present_flag | u(1) |
|     if (extra_slice_header_bits_present_flag) { | |
|         extension_flag_slice_header | u(v) |
|         additional_extra_slice_header_bits_present_flag | u(1) |
|         if (additional_extra_slice_header_bits_present_flag) | |
|             additional_extension_flag_slice_header | u(v) |
|     } | |
|     pic_parameter_set_id | ue(v) |
|     ... | |
| } | |

Referring to Table 16, first_slice_segment_in_pic_flag equal to 1 specifies that that a current slice segment is a first slice segment in decoding order, while first_slice_segment_in_pic_flag equal to 0 specifies that the slice segment is not the first slice segment in decoding order.

no_output_of_prior_pics_flag affects output of a previously decoded picture in a DPB after an IDR picture or BLA picture is decoded among random access point pictures other than a first picture in a bit stream.

extra_slice_header_bits_present_flag equal to 0 may specify that extension_flag_slice_header [i] is absent, while extension_flag_slice_header [i] equal to 1 may specify that extension_flag_slice_header [i] is present.

extension_flag_slice_header [i] has semantics and a value reserved for future use. That is, extension_flag_slice_header [i] is a reserved flag, which may have a number of semantics and values corresponding to num_extra_slice_header_bits.

An extra bit number for signaling extension_flag_slice_header may be determined as a preset value or determined depending on a profile definition.

additional_extra_slice_header_bits_present_flag equal to 0 may specify that additional_extension_flag_slice_header is not present, while additional_extra_slice_header_bits_present_flag equal to 1 may specify that additional_extension_flag_slice_header is present.

additional_extension_flag_slice_header has semantics and a value reserved for future use. A bit number for signalling additional_extension_flag_slice_header may be greater than 0.

An extra bit number for signalling additional_extension_flag_slice_header may be determined as a preset value or determined depending on profile definition.

pic_parameter_set_id specifies a value of pps_pic_parameter_set for a used PPS, which may range from 0 to 63.

In Table 16, the slice header according to the present option further includes additional information for signalling the reserved flag, such as additional_extra_slice_header_bits_present_flag and additional_extension_flag_slice_header.

Second Part—Option 4

Option 4, which is an extension of signalling illustrated in Options 4 to 6 of the first part, suggests a multi-step structure for signalling an extended flag (reserved flag) in a slice header. According to the present option, extended flags are not signalled in a dependent slice segment.

The slice header according to the present option has syntax elements listed in Table 17 or 18.

TABLE 17

|  | Descriptor |
| --- | --- |
| slice_segment_header( ) { | |
|     first_slice_segment_in_pic_flag | u(1) |
|     if( RapPicFlag ) | |
|         no_output_of_prior_pics_flag | u(1) |
|     extra_slice_header_bits_present_flag | u(1) |
|     if (extra_slice_header_bits_present_flag | |
|     && !dependent_slice_segment_flag) { | |
|         extension_flag_slice_header | u(v) |
|         additional_extra_slice_header_bits_present_flag | u(1) |
|         if (additional_extra_slice_header_bits_present_flag) | |
|             additional_extension_flag_slice_header | u(v) |
|     } | |
|     pic_parameter_set_id | ue(v) |
|     ... | |
| } | |

Referring to Table 17, extension_flag_slice_header [i] is signalled only when extra_slice_header_bits_present_flag is 1 and dependent_slice_segment_flag is not 1. If dependent_slice_segment_flag, which is a syntax element included and signalled in the slice header, is 1, a syntax element value of each slice segment header is not present and inferred from syntax element values of a corresponding slice segment header in the slice header. That is, dependent_slice_segment_flag equal to 1 specifies that a current slice is a dependent slice.

TABLE 18

| | Descriptor |
|---|---|
| slice_segment_header( ) { | |
|     first_slice_segment_in_pic_flag | u(1) |
|     if( RapPicFlag ) | |
|         no_output_of_prior_pics_flag | u(1) |
|     if (!dependent_slice_segment_flag) { | |
|         extra_slice_header_bits_present_flag | u(1) |
|         if (extra_slice_header_bits_present_flag) { | |
|             extension_flag_slice_header | u(v) |
|             additional_extra_slice_header_bits_present_flag | u(1) |
|             if (additional_extra_slice_header_bits_present_flag) | |
|                 additional_extension_flag_slice_header | u(v) |
|         } | |
|     } | |
|     pic_parameter_set_id | ue(v) |
|     ... | |
| } | |

Referring Table 18, extra_slice_header_bits_present_flag is signalled only when dependent_slice_segment_flag is not 1. That is, if the current slice is a dependent slice, a reserved flag extension_flag_slice_header, which is signalled according to extra_slice_header_bits_present_flag and extra_slice_header_bits_present_flag, is not signalled.

Embodiments illustrating the all aforementioned options for the first part of signalling an indication of an NAL unit header flag extension and all possible positions where a flag or information to indicate existence of an extended flag is present may be realized independently of embodiments illustrating the all aforementioned options for the second part of signalling an NAL unit header flag extension in a slice header and all possible positions where an extended flag is present. Thus, the embodiments of the first part may be realized in combination with the embodiments of the second part.

Figure 7:
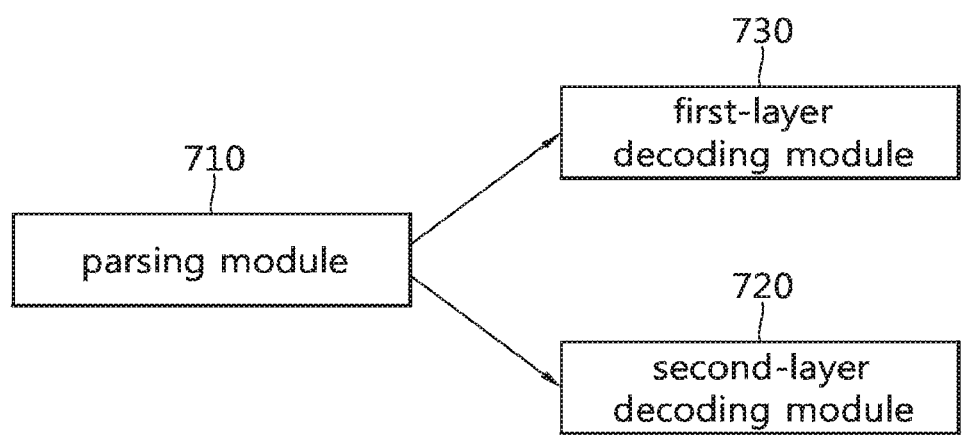
FIG. 7 is a block diagram illustrating a video decoding apparatus according to the present invention.

FIG. 7 is a block diagram illustrating a video decoding apparatus according to an exemplary embodiment of the present invention.

The video decoding apparatus according to the present embodiment includes a parsing module 710, a first-layer decoding module 720 and a second-layer decoding module 730.

The parsing module 710 is a component to get information desired by the first-layer decoding module 720 and the second-layer decoding unit 730 from a received bit stream, which may be configured as an entropy decoding module.

The parsing module 710 may be included in the decoding apparatus which practically decodes a video or in a system.

The parsing module 710 parses an NAL unit payload to verify indication information and reserved information included in the NAL unit payload.

First, the parsing module 710 parses the indication information specifying whether the reserved information for future use is present, and parses a slice header including the reserved information when the indication information specifies that the reserved information is present. That is, according to the present invention, the indication information and the reserved information are received, being included in the NAL unit payload, instead of in an NAL unit header.

In one embodiment of the present invention, the indication information may be received, being included in a PPS. In this case, the indication information may be signalled at a position following a syntax element indicating an SPS ID of an SPS activated in the parameter set and a syntax element specifying presence of flag information indicating whether the slice header is a dependent slice header.

In another embodiment of the present invention, the indication information may be received, being included in an SPS or VPS.

The indication information is signalled, being included in a non-VCL NAL unit.

The indication information may be information specifying an extra slice header bit number added for the slice header to include the reserved information. For example, the indication information may be signalled with a syntax element num_extra_slice_header_bits.

Alternatively, the indication information may be a flag specifying presence of the indication information, such as extra_slice_header_bits_present_flag.

When the bit stream supports a single-layer video, the extra slice header bit number is 0. When the bit stream supports a multi-layer video, the extra slice header bit number is 1 or greater.

Meanwhile, the reserved information, which may be referred to as a reserved flag or extended flag, is information used for a multi-viewpoint layer and a video supporting spatial scalability or a 3D video. The reserved information may have a number of semantics and values corresponding to the extra slice header bit number and be signalled as a syntax element extension_flag_slice_header, slice_reserved_undetermined_flag and slice_reserved_flag.

Meanwhile, the reserved information may be received only when a current slice is not a dependent slice.

When the bit stream is a video signal supporting a plurality of layers, the first-layer decoding module 720 may decode a base layer referenced by another layer, and the second-layer decoding module 730 may decode an upper layer by referring to the base layer.

The first-layer decoding module 720 and the second-layer decoding module 730 may be practically configured as a single chip or module, although shown in separately in FIG. 7, without being limited thereto.

In the base layer, the indication information and the reserved information are not activated.

In an extended layer based on the base layer, reserved information may be present. For instance, the reserved information may be used for a multi-viewpoint layer and a video supporting spatial scalability or a 3D video.

In this case, the second-layer decoding module 730 may decode an upper-layer video based on semantics and a value included in the reserved information.

Figure 8:
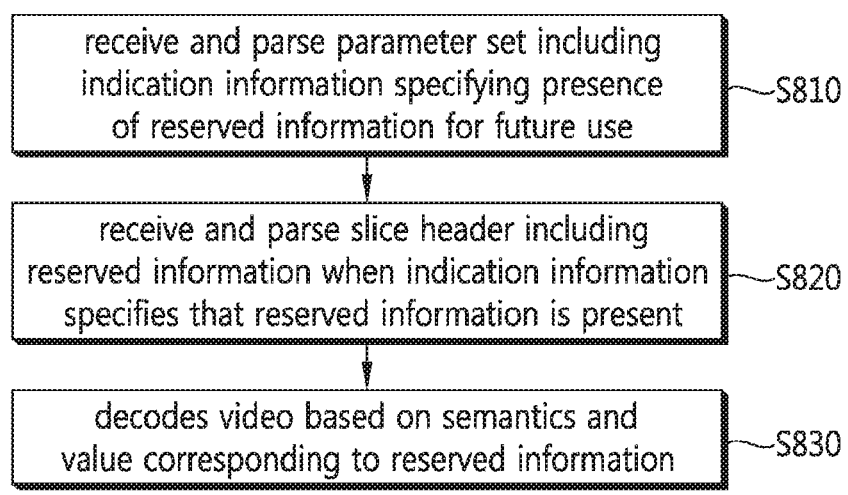
FIG. 8 is a flowchart illustrating a video decoding method according to the present invention.

FIG. 8 is a flowchart illustrating a video decoding method according to the present invention.

Referring to FIG. 8, a decoding apparatus receives and parses a parameter set including indication information specifying presence of reserved information for future use (S810).

The indication information may be received, being included in a PPS, and be signalled as information representing an extra slice header bit number added for a slice header to include the reserved information.

When a bit stream supports a single-layer video, the extra slice header bit number is 0.

The indication information may be signalled at a front position in the PPS. For example, the indication information may be signalled at a position following a syntax element indicating an SPS ID of an SPS activated in the parameter set and a syntax element specifying presence of flag information indicating whether the slice header is a dependent slice header.

The decoding apparatus receives and parses the slice header including the reserved information when the indication information specifies that the reserved information is present (S820).

The reserved information may be unspecified information to be used for a multi-viewpoint layer and a video supporting spatial scalability or a 3D video and have a number of semantics and values corresponding to the extra slice header bit number.

Subsequently, the decoding apparatus decodes a video based on semantics and a value corresponding to the reserved information (S830).

When the bit stream supports a single layer only, the indication information signals that the reserved information is not present, and accordingly a single layer is decoded according to a general video decoding method.

If the bit stream supports a plurality of layers, the decoding apparatus decodes an upper layer based on reserved information having new semantics and new values for an extended layer.

As described above, the present invention extends a structure of an NAL unit header with a limited space to include and signal a reserved flag in a slice header when a layer is extended, like a bit stream supporting a plurality of layers, and thus needs an extra bit for describing the extended layer.

Reserved information, such as a reserved flag, is signalled at a front position in the slice header to parse up to the slice header, unlike a conventional manner of parsing the NAL unit header only.

Here, indication information specifying whether the reserved information is present may be signalled, being included in a parameter set, for example, a PPS.

Meanwhile, the reserved information is not signalled when a current slice is a dependent slice.

Although methods of illustrative systems have been described with a series of stages or blocks based on the flowcharts, the present invention is not limited to the foregoing sequence of the stages. Some stages may be carried out in different order from described above or at the same time. Further, it should be noted that as the aforementioned embodiments may include various aspects of examples, combinations of the embodiments may be also understood as exemplary embodiments of the present invention. Thus, it will be appreciated that changes, modifications and alternatives may be made in these exemplary embodiments without departing from the principles and spirit of be the invention, the scope of which is defined in the appended claims and their equivalents.

The invention claimed is:

1. A picture decoding method, by a decoding apparatus, comprising:
   receiving a picture parameter set (PPS) comprising a num_extra_slice_header_bits syntax element specifying a number of extra bits for a slice segment header;
   receiving the slice segment header, wherein the slice segment header comprising zero or more reserved flags when a current slice segment is not a dependent slice segment, wherein a number of the reserved flags in the slice segment header is same as the number of extra bits which is determined based on the num_extra_slice_header_bits syntax element; and
   decoding a picture based on the slice segment header,
   wherein the picture parameter set further comprises a first picture parameter set identifier syntax element specifying an identifier (ID) of the picture parameter set,
   wherein the slice segment header further comprises a second picture parameter set identifier syntax element indicating the identifier (ID) of the picture parameter set, and
   wherein the slice segment header comprises a dependent slice segment flag representing whether the current slice segment is the dependent slice segment.

2. The method of claim 1, wherein the num_extra_slice_header_bits syntax element is signaled at a position following a syntax element specifying a sequence parameter set (SPS) identifier (ID) of an SPS activated in the picture parameter set.

3. The method of claim 1, wherein the reserved flag is for a multi-viewpoint layer and a video supporting spatial scalability or a three-dimensional (3D) video.

4. The method of claim 1, wherein the num_extra_slice_header_bits syntax element is represented by 3 bits, and
   wherein each of the reserved flag is represented by 1 bit.

5. The method of claim 1, wherein a descriptor of the num_extra_slice_header_bits syntax element is u(3) representing unsigned integer using 3 bits, and a descriptor of each of the reserved flag is u(1) representing unsigned integer using 1 bit.

6. An image information encoding method, by an encoding apparatus, comprising:
   configuring a picture parameter set (PPS) comprising a num_extra_slice_header_bits syntax element specifying a number of extra bits for a slice segment header;
   configuring the slice segment header, wherein the slice segment header comprising zero or more reserved flags when a current slice segment is not a dependent slice segment, wherein a number of the reserved flags in the slice segment header is same as the number of extra bits which is determined based on the num_extra_slice_header_bits syntax element; and
   encoding image information including information on the picture parameter set and information on the slice segment header,
   wherein the picture parameter set further comprises a first picture parameter set identifier syntax element specifying an identifier (ID) of the picture parameter set, and
   wherein the slice segment header further comprises a second picture parameter set identifier syntax element indicating the identifier (ID) of the picture parameter set, wherein the slice segment header comprises a dependent slice segment flag representing whether the current slice segment is the dependent slice segment.

7. The method of claim 6, wherein the num_extra_slice_header_bits syntax element is signaled at a position following a syntax element specifying a sequence parameter set (SPS) identifier (ID) of an SPS activated in the picture parameter set.

8. The method of claim 6, wherein the reserved flag is for a multi-viewpoint layer and a video supporting spatial scalability or a three-dimensional (3D) video.

9. The method of claim 6, wherein the num_extra_slice_header_bits syntax element is represented by 3 bits, and
wherein each of the reserved flag is represented by 1 bit.

10. The method of claim 6, wherein a descriptor of the num_extra_slice_header_bits syntax element is u(3) representing unsigned integer using 3 bits, and a descriptor of each of the reserved flag is u(1) representing unsigned integer using 1 bit.

11. A non-transitory decoder-readable storage medium storing an encoded image information generated by an encoding process comprising:
configuring a picture parameter set (PPS) comprising a num_extra_slice_header_bits syntax element specifying a number of extra bits for a slice segment header;
configuring the slice segment header, wherein the slice segment header comprising zero or more reserved flags when a current slice segment is not a dependent slice segment, wherein a number of the reserved flags in the slice segment header is same as the number of extra bits which is determined based on the num_extra_slice_header_bits syntax element; and
encoding image information including information on the picture parameter set and information on the slice segment header,
wherein the picture parameter set further comprises a first picture parameter set identifier syntax element specifying an identifier (ID) of the picture parameter set, and
wherein the slice segment header further comprises a second picture parameter set identifier syntax element indicating the identifier (ID) of the picture parameter set,
wherein the slice segment header comprises a dependent slice segment flag representing whether the current slice segment is the dependent slice segment.

12. The non-transitory decoder-readable storage medium of claim 11, wherein the num_extra_slice_header_bits syntax element is represented by 3 bits, and
wherein each of the reserved flag is represented by 1 bit.

13. The non-transitory decoder-readable storage medium of claim 11, wherein a descriptor of the num_extra_slice_header_bits syntax element is u(3) representing unsigned integer using 3 bits, and a descriptor of each of the reserved flag is u(1) representing unsigned integer using 1 bit.

* * * * *